March 1, 1927.  H. W. KERR  1,619,793

WIRE LINE BELT GUIDE

Filed Feb. 24, 1925

INVENTOR.
Herbert W. Kerr.
BY
Geo. T. Kimmel ATTORNEY.

Patented Mar. 1, 1927.

1,619,793

UNITED STATES PATENT OFFICE.

HERBERT W. KERR, OF AUGUSTA, KANSAS.

WIRE LINE BELT GUIDE.

Application filed February 24, 1925. Serial No. 11,312.

This invention relates to wire line belt guides, and has for its primary object the provision, in a manner as hereinafter set forth, of a device adapted to be clamped upon a clutch pulley of a machine to transmit power therefrom to a band wheel or other machinery, and having means, whereby the friction surface of the guide over which the wire line belt passes may be replaced after the same has become worn.

Another object of the invention is the provision, in a manner hereinafter set forth, of a wire line belt guide having replaceable wear plates in the peripheral groove of the guide, which are transversely corrugated to insure against the slipping of the wire line belt passing about the guide.

The device embodying this invention is primarily intended for use in oil field work or work where wire lines are available. It is well known that in transmitting power by means of a flat belt, the belt is soon worn out and the replacement of the same is quite an item of expense. In the device embodying this invention a wire line belt may be used, the device being clamped on the clutch pulley of an engine and the wire line passing thereover and seated in the peripheral groove formed in the device. The device is formed in two sections and is adapted to be easily adjusted to pulleys of different sizes and the peripheral groove is provided with transversely corrugated steel wear plates, which act to make a non-slipping contact with the wire line belt and also prevent the device proper from becoming worn owing to the fact that they receive the wear from the contact with the wire line. When these plates have become badly worn they may be easily replaced with new ones.

A final object of the invention is the provision, in a manner as hereinafter set forth of a wire line belt guide of strong and durable construction, easily and quickly adjustable to a clutch pulley and positive and satisfactory in operation.

The invention will be best understood from a consideration of the following detailed description taken in connection with the accompanying drawing forming a part of the specification, with the understanding that the invention is not confined to any strict conformity with the showing of the drawing but may be changed and modified so long as such changes and modifications mark no material departure from the salient features of the invention as expressed in the appended claims.

In the drawing:—

Figure 1:
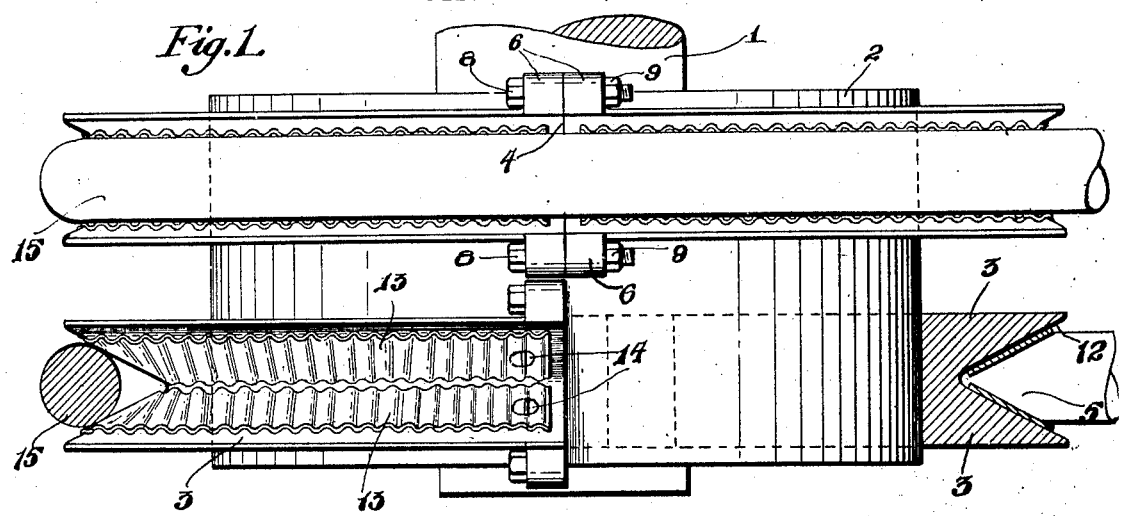
Fig. 1 is a plan view of a pair of the devices embodying this invention, secured about a power pulley, half of one of the devices being shown in section.
Figure 2:
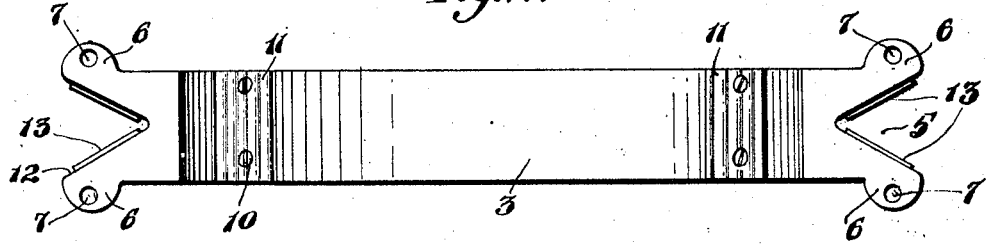
Fig. 2 is a plan view of the inner face of half of the device embodying this invention.
Figure 3:
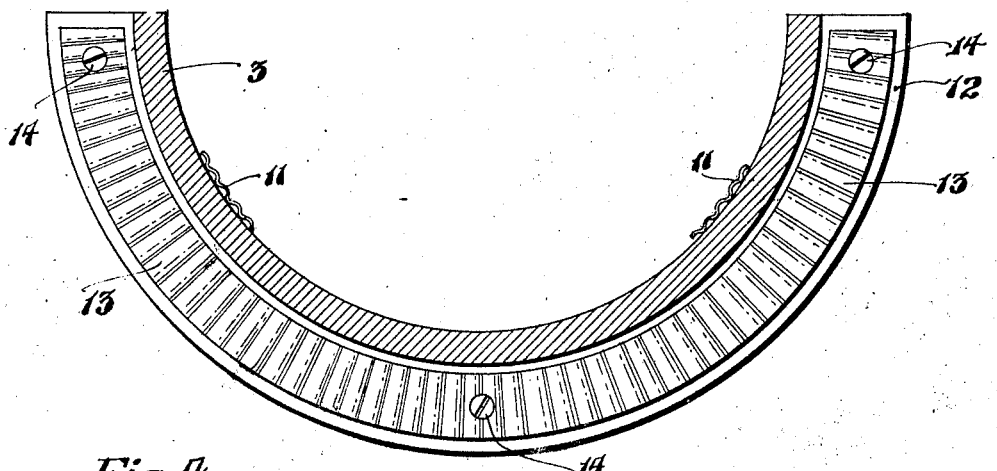
Fig. 3 is a section taken upon the line 3—3 of Fig. 2.
Figure 4:
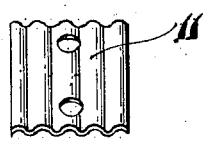
Fig. 4 is a detailed perspective view of a gripping plate of the device.

Referring now to the drawing in detail wherein like numerals of references indicate corresponding parts throughout the several views of the drawing, the numeral 1 indicates a power shaft carrying a pulley 2 thereon.

The device embodying this invention comprises a pair of semi-annular members 3 adapted to fit about the pulley 2 and have their ends abut as at 4. These members 3 each have a peripheral groove formed therein and when they are in position about the pulley the groove 5 is continuous thereabout as shown.

Each of the members 3 has a laterally projecting ear 6 upon each side and at each end thereof, the face of these ears being flush with the end face of the member upon which they are formed. An aperture 7 is formed through each of the ears 6 and these apertures align one with the other when the members 3 are in opposed relation about a pulley, and a bolt 8 is then passed therethru and secured by means of the nut 9 to clamp the members 3 to the pulley.

Upon the inner face of each of the members 3 there is secured by means of countersunk screws 10 semi-circular corrugated plates 11, which extend transversely of the member 3. The corrugations of these plates 11 extend across the member to which the plate is secured, and these plates act to engage the face of the pulley when the members are secured thereabout, to prevent the belt guide from moving circumferentially on the pulley.

The plates are normally flared from the inner to the outer edge, as shown, to adapt them to the curve of the surface against which they are applied.

The peripheral groove 5 is here shown as V-shaped, although applicant does not limit himself to a groove of this cross-sectional contour, for the same may be substantially semi-circular or U-shaped.

In the groove 5 there is secured against each of the walls 12 thereof a substantially semi-circular wear plate 13, this plate having countersunk screws 14 passed therethrough and further, being transversely corrugated as shown so that when the two plates 13 are in position in the groove of each of the semi-annular pairs of the device, and these halves in position about the pulley 2, a V-shaped corrugated walled peripheral groove is set up in which a wire rope belt 15 is seated and this belt when in motion is prevented from slipping on the device, due to a corrugated wear plate 13.

The wear plates 13 and also the pulley gripping plates 11 are removable and may be readily replaced by new ones, when the ones in use have become badly worn.

In the use of this device, wire line belts may be used in the place of flat belts ordinarily used, and longer and uninterrupted service is had due to the fact that the wire line belts greatly outlast the flat belts and further that lost motion or power due to the slipping of the belts is eliminated through the use of the corrugated wear plates 13.

From the foregoing description it will be readily seen that there has been set up a device which when used will improve the efficiency of the machines to which applied due to the prevention of lost power through the slipping of the belt and the consequent quick destruction of the same as a result of such slipping.

Having thus described my invention, what I claim is:—

1. A replaceable wear element for a pulley provided with an annular groove of V-shaped cross section, consisting of a semi-circular plate conforming in curvature to the curve of the groove and of a width less than the depth of the groove, said plate being formed throughout with transverse corrugations and flaring throughout from its inner to its outer edge to have its inner face seated throughout against one wall of the grove, and spaced counter-sunk means for securing said plate against one of the walls of the groove.

2. A replaceable wear element for a pulley provided with an annular groove of V-shaped cross section, consisting of a semi-circular plate conforming in curvature to the curve of the groove and of a width less than the depth of the groove, said plate being formed throughout with transverse corrugations and flaring throughout from its inner to its outer edge to have its inner face seated throughout against one wall of the groove, and spaced counter-sunk means for securing said plate against one of the walls of the groove, said plate having the lengthwise edges thereof spaced from the top and bottom walls of the groove.

In testimony whereof, I affix my signature hereto.

HERBERT W. KERR.